United States Patent [19]

Kanno et al.

[11] 4,327,783
[45] May 4, 1982

[54] FUEL SUPPLY PIPE ANTI SPLASH BACK DEVICE

[75] Inventors: Masato Kanno; Kyoji Yamamoto, both of Toyota, Japan

[73] Assignee: Toyota Jidosha Kogyo Kabushiki Kaisha, Aichi, Japan

[21] Appl. No.: 170,155

[22] Filed: Jul. 18, 1980

[30] Foreign Application Priority Data

Aug. 29, 1979 [JP] Japan .......................... 54-119578[U]

[51] Int. Cl.³ ............................................. B65B 3/04
[52] U.S. Cl. .................................. 141/349; 220/86 R
[58] Field of Search ...................... 239/504, 288, 288.3, 239/288.5; 220/86 R, 86 AT, 293, 298, 303, 304; 141/286, 345, 346, 347, 348, 349

[56] References Cited

U.S. PATENT DOCUMENTS 3,880,317  4/1975  Arnett .............................. 220/86 R
3,912,117  10/1975  Ryding ............................ 220/86 R Primary Examiner—James B. Marbert
Attorney, Agent, or Firm—Birch, Stewart, Kolasch & Birch

[57] ABSTRACT

A fuel supply tube for supplying fuel by a fuel supply nozzle to the fuel tank of an automobile, at the upper end of which is defined a fuel input orifice, and within the fuel supply tube, near the fuel input orifice, there is provided a barrier member for preventing splashing back of fuel ejected from the fuel supply nozzle inserted into the fuel supply tube. The barrier member includes a flat ring extending in the radial direction of the fuel supply tube, whose outer edge joins to the inner surface of the tube, and also includes a short cylinder whose end is joined to the inner edge of the flat ring, and which extends in the direction of the fuel tank. A fuel drain gap is formed through the outer edge of the flat ring at its lowest point, to allow fuel to be drained from above the barrier member down toward the fuel tank.

6 Claims, 4 Drawing Figures

FUEL SUPPLY PIPE ANTI SPLASH BACK DEVICE

BACKGROUND OF THE INVENTION

The present invention relates to a fuel supply system for supplying liquid fuel into a fuel tank, and more particularly relates to a barrier member, which is located within a fuel supply tube which conducts fuel to a fuel tank, and which prevents splashing back of fuel during filling of the fuel tank.

In an automotive vehicle or the like, for filling the fuel tank thereof, there is generally provided a fuel supply tube, a lower end of which is connected to the fuel tank, and an upper end of which is adapted for receiving a fuel nozzle of a fuel supply system such as a gasoline pump, said nozzle being inserted thereinto. It is very common for such a fuel supply tube to be bent or curved near its upper end, in order to conform it to the construction of the automobile body and the position of the fuel tank therein.

A problem occurs with such a fuel supply tube, which is particularly serious in the case of a curved fuel supply tube as described above. When fuel is being supplied into the fuel supply tube from a nozzle of a fuel pump or the like, it often occurs that the incoming fuel strikes the internal wall of the tube, especially on the radially outer side of any such curved portion, and a portion of this fuel may splash or bounce back up the fuel supply tube, so as to hit the fuel nozzle.

This can cause difficulties for two possible reasons. First, if the fuel splashes back sufficiently forcefully, it may even be ejected from out of the orifice of the fuel supply tube to spill down the body of the automobile, which is dirty and dangerous. Second, even if fuel does not actually splash back out of the fuel supply tube, there is a danger that splashed back fuel may trigger a fuel detector mounted on the fuel nozzle of the fuel supply pump. Generally, the nozzle of a fuel supply pump usually incorporates a fuel detector at or near its tip, which includes an auto-stop mechanism, in order to ensure that when the fuel tank of the vehicle has been completely filled by the fuel supplied from the nozzle, the fuel supply from the fuel pump is automatically cut off, when the level of fuel rises to above the tip of the nozzle. Thereby over filling of the fuel tank beyond the orifice of the fuel supply tube, which could cause spillage of large quantities of fuel, is positively prevented. However, splashing back of fuel may cause such an auto-stop mechanism to be triggered prematurely, and thus, before the fuel tank is properly filled, the supply of fuel by the fuel nozzle may be repeatedly interrupted, thus causing considerable inconvenience during filling of the tank. In the worst case, the time required for proper filling of the tank can be so long that the operation becomes impracticable.

SUMMARY OF THE INVENTION

Therefore, it is an object of the present invention to provide a fuel supply system for supplying fuel to a fuel tank, which incorporates a barrier member for intercepting splashed back fuel which has been reflected from a part of the inner wall of the fuel supply tube, without substantially obstructing the flow of fuel which is being supplied to the fuel tank from the nozzle of a fuel supply pump.

A further object of the present invention is to provide a fuel supply system, in which any splashed back fuel which has passed the barrier member so as to collect on its upper surface is effectively drained back into the fuel tank, without lying in a pool on part of the upper surface of the barrier member.

According to the present invention, these and other objects are accomplished by a fuel supply system for supplying fuel to a fuel tank, comprising: a fuel supply tube, a lower end of which is connected to said fuel tank, and an upper end of which defines a fuel input orifice; and a barrier member located within the fuel supply tube near the fuel input orifice, comprising: a substantially flat-annular first portion which lies in a plane which is intersected substantially perpendicularly by the axis of the fuel supply tube, and whose outer edge meets the inner surface of the fuel supply tube; and a second portion substantially formed as a tube, the circumferential edge of one of whose ends is connected to the inner edge of said substantially flat-annular first portion, and which extends therefrom in the direction of the fuel tank with its axis substantially parallel to the axis of the fuel supply tube.

According to such a construction, the end of the nozzle of a fuel supply pump is inserted through the fuel input orifice, and then the supply of fuel from the nozzle is commenced. This flow of fuel passes through the central hole of the tubular second portion of the barrier member, and proceeds downwards to the fuel tank. Any splashed back fuel which may be reflected back upwards towards the barrier member is almost all intercepted either by the lower surface of the flat-annular first portion of the barrier member, or by the outer surface of the tubular second portion of the barrier member. Thereby, the splashed back fuel is prevented from passing to the upper side of the barrier member, and, accordingly, cannot reach any auto-stop mechanism on the end of the nozzle of the fuel supply pump, because the nozzle is not inserted so far into the fuel supply tube as to reach the barrier member. Accordingly, filling of the fuel tank is enabled to proceed smoothly and progressively, with no interruption thereto being caused by undesirable triggering of the auto-stop mechanism by splashed back fuel.

According to a further particular aspect of the present invention, the barrier member may be not horizontal, and the lowest part of the flat-annular first portion may be formed with a gap communicating its upper surface to its lower surface.

According to this particular construction, any splashed back fuel which may perchance have passed the barrier member and reached the upper surface thereof, and also fuel which has been diverted from the main flow of fuel proceeding from the nozzle of the fuel supply pump and which has collected in a pool formed in a hollow defined by the lowermost part of the upper surface of the barrier member and by the adjoining inner surface of the fuel supply pipe, is positively and definitely drained through said gap, so as to be returned to the fuel tank. This is helpful both for preventing wastage of fuel by evaporation, and also for preventing possible improper triggering of the auto-stop mechanism of the nozzle of the fuel supply pump.

BRIEF DESCRIPTION OF THE DRAWINGS

The present invention will become more fully understood from the following description of several preferred embodiments thereof, which is to be taken in conjunction with the accompanying drawings. It should be clearly understood, however, that the description of the embodiments, and the drawings, are all provided purely for the purposes of illustration and exemplification only, and are in no way to be taken as limitative of the scope of the present invention. In the drawings.

DESCRIPTION OF THE PREFERRED EMBODIMENTS

The present invention will now be described in terms of several preferred embodiments thereof, and with respect to the accompanying drawings.

Figure 1:
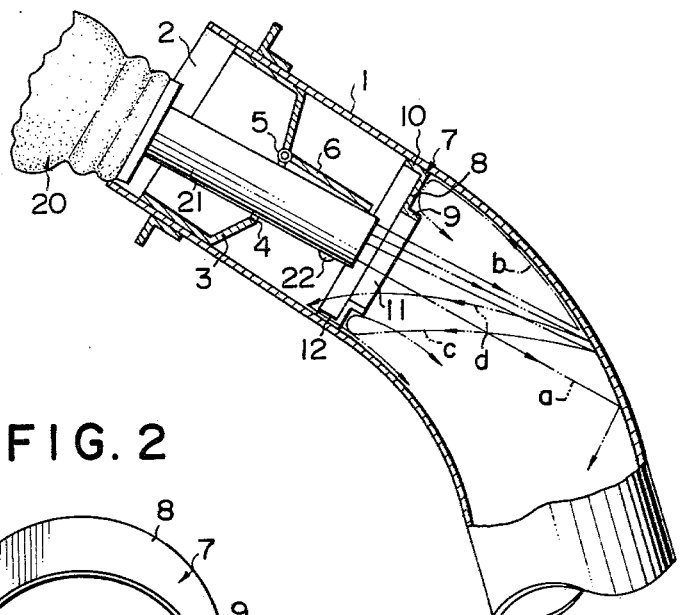
FIG. 1 is a vertical part sectional view through a fuel supply system which is a preferred embodiment of the present invention, showing a fuel supply nozzle of a fuel pump as inserted thereinto.

Referring to FIG. 1, the fuel supply system herein shown comprises a fuel supply tube 1, the lower end of which is connected to a fuel tank which is not shown, so as to supply fuel thereinto. The upper end of this fuel supply tube 1 is shown as cut away, and is curved in an elbow shape. At the upper end of the tube 1 there is defined a fuel input orifice 2, and, as shown in the drawing, this orifice 2 is adapted for insertion of a fuel supply nozzle 21 of a fuel supply gun 20, for supplying fuel into the fuel supply tube 1 and therethrough to the fuel tank. As is generally practiced, the shown fuel supply nozzle 21 is provided on its under side near its tip with a fuel detector 22 for cutting off the supply of fuel from the nozzle 21 when presence of fuel is detected by the fuel detector 22. This is in order to guard against over filling of the fuel tank.

Within the fuel supply tube 1, near the fuel input orifice 2, there is provided a closure bung 3, which is formed with an aperture 4 whose size and shape are so arranged as to prevent any nozzles of fuel supply pumps, other than a predetermined size from being passed therethrough. For example, for a modern vehicle which uses lead free gasoline, the aperture 4 in the closure bung 3 may be made of such a size as to admit only the nozzles of gasoline supply pumps which provide lead free gasoline, which according to law are made smaller than nozzles of pumps which supply leaded gasoline. The aperture 4 is opened and closed by a door 6 which is pivoted at a hinge 5. Thus, when the fuel supply nozzle 21 is approached to the aperture 4, it presses open the door 6 and passes through the aperture 4, but, when no nozzle is presented to the aperture 4, the door 6 pivots and closes the aperture 4 and prevents escape of fuel vapors from the fuel tank and from the fuel supply tube 1, thereby resulting in minimization of atmospheric pollution and saving of fuel.

Below the closure bung 3 within the fuel supply tube 1 there is provided, according to the present invention, a barrier member 7, for preventing splashed back fuel from interfering with the fuel detector 22 on the fuel supply nozzle 21. It is to be particularly noted that the barrier member 7 is provided far enough down within the fuel supply tube 1 to be below the end of the fuel supply nozzle 21, when the fuel supply nozzle 21 is inserted into the fuel input orifice 2 for the supply of fuel thereinto, as shown in the drawing.

The barrier member 7 is formed as comprising a substantially flat-annular first portion 8, which extends generally perpendicularly to the central axis of the fuel supply tube 1, i.e. in a plane which is radial to the fuel supply tube 1. The outer edge of the flat-annular first portion 8 meets the inner surface of the fuel supply tube 1. In fact, in this embodiment, from the outer edge of the flat-annular first portion 8, there extends upwards, away from the fuel tank, an outer tubular flange 10, for the purpose of fixing the barrier member 7 within the fuel supply tube 1; but this is not essential to the present invention. Further, in this embodiment, the flat-annular first portion 8, and a tubular second portion 9 which will be described later, are not formed complete annular, but are broken by a fuel drain gap 12 located at a portion which is lowest when the barrier member 7 is mounted within the fuel supply tube 1, as will be described later.

Further, the barrier member 7 comprises a tubular second portion 9, which is generally formed as a short tube whose axis is substantially parallel to the axis of the fuel supply tube 1 at the point at which it is fixed therein, and which extends from the inner circumferential edge of the flat-annular first portion 8 in the direction of the fuel tank, i.e., in the direction away from the fuel input orifice 2. Thus, the interior of the tubular second portion 9 defines an opening 11 for allowing the flow of fuel from the fuel supply nozzle 21 down into the lower part of the fuel supply tube 1 and into the fuel tank.

Figure 2:
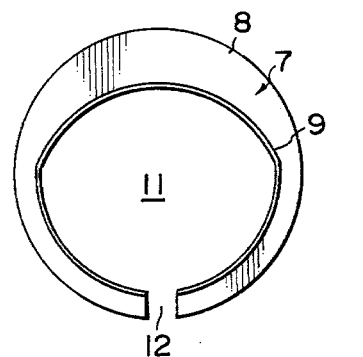
FIG. 2 is an end on view, showing a barrier member incorporated in the fuel supply system according to the preferred embodiment of the present invention shown in FIG. 1, whose generally annular shape is interrupted by a cut away portion.

As shown more clearly in FIG. 2, the shape of the opening 11 formed through the barrier member 7 is such that the radial extension of the flat-annular first portion 8 is greater in its portion most removed from the fuel drain gap 12, i.e. at its portion which is fixed uppermost within the fuel supply tube 1.

Figure 3:
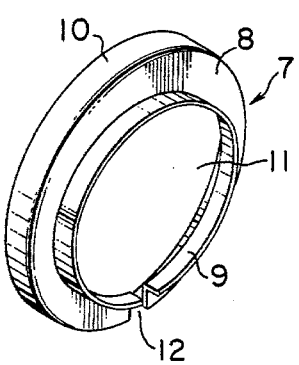
FIG. 3 is a perspective view of the barrier member shown in FIG. 2.

FIG. 3 shows the barrier member 7 in perspective view.

In FIG. 1, there are shown various lines a, b, c, and d, which illustrate various trajectories for fuel supplied from the fuel supply nozzle 21 of the fuel supply gun 20. Most of the fuel which is ejected from the fuel supply nozzle 21 hits the radially outer side of the curved wall surface of the fuel supply tube 1 at its elbow portion, as shown in the drawing. Of course most of this fuel is then directed downwards to the fuel tank, as shown by the line a; but a certain part of this fuel is splashed back. The line b shows one of the splash back trajectories, in which fuel travels in a surface-adhering manner along the upper side of the inner surface of the fuel supply tube 1, and is conducted therealong to impinge upon the upper part of the lower surface of the barrier member 7. Because of the provision of the barrier member 7, this fuel is directed radially inwards along the lower side of the flat-annular first portion 8, and then strikes the outer surface of the tubular second portion 9, and then is directed by the second portion 9 downwards so as to be sent to the fuel tank, as shown by the arrow in the figure. Without the provision of this tubular second portion 9, the fuel would continue to travel substantially radially to the fuel supply tube 1, and might well splash to the upper side of the barrier member 7.

Further, some of the fuel, as shown by the trajectories c and d in FIG. 1, is reflected at an angle off the curved inner surface of the fuel supply tube 1, and splashes towards the lower part of the barrier member 7. Part of this fuel, as shown by the trajectory c, strikes the opposite wall of the fuel supply tube 1, and is directed therealong and strikes the lower part of the lower surface of the flat-annular first portion 8, whence it travels upwards along this lower surface in a substantially radial direction to the fuel supply tube 1, and impinges upon the lower part of the outer surface of the tubular second portion 9, which directs it around, as shown by the arrow, so that it is sent downwards to the fuel tank. Again, if the tubular second portion 9 were not provided, there would be a likelihood that part of this fuel would reach the upper surface of the barrier member 7, where it might interfere with the fuel detector 22 mounted on the fuel supply nozzle 21 and cause it to be triggered, thereby interrupting and interfering with the supply of fuel from the fuel supply nozzle 21.

Further, inevitably, a part of the fuel which has been bounced back at an angle from the curved inner surface of the fuel supply tube 1 in fact passes straight through the opening 11 in the barrier member 7, as shown by the trajectory d in FIG. 1. This fuel then, as a matter of course, strikes the inner surface of the fuel supply tube 1 at a point above the barrier member 7, and trickles down it so as to strike the upper surface of the barrier member 7. However, this fuel is prevented from accumulating in a pool in a hollow defined by the lower part of the upper surface of the barrier member 7 and the part of the inner wall surface of the fuel supply tube 1 contiguous thereto, because of the provision of the fuel drain gap 12, which allows this fuel to be drained therethrough, and to trickle, as shown by the arrow, down the lower part of the inner surface of the fuel supply tube 1 towards the fuel tank. Without the provision of this fuel drain gap 12, the fuel pool which would form on the upper side of the barrier member 7 might interfere with the fuel detector 22 and cause undesirable triggering thereof, thus preventing proper supply of fuel from the fuel supply nozzle 21 into the fuel tank. Further, this pool of fuel would remain in this position after the fuel supply nozzle 21 had been withdrawn from the fuel input orifice 2, and would as a matter of course evaporate, thereby producing vapors which would inevitably percolate through the aperture 4 in the closure bung 3, past the door 6, and escape to the atmosphere, thereby both causing undesirable atmospheric pollution and also wasting fuel.

The provision of the tubular second portion 9 as extending downwards towards the fuel tank from the inner circumference of the flat-annular first portion 8, as may be seen by the description above, greatly facilitates the positive downward direction of splashed back fuel which follows trajectories such as b or c towards the fuel tank, and prevents such fuel from passing to the upper surface of the barrier member 7.

According to a particular feature of the present invention, the radial dimension of the flat-annular first portion 8 is made larger in its portion which is mounted at a higher position within the fuel supply tube 1, as seen in FIG. 2. This is particularly to prevent the splashed back fuel from reaching the upper end surface of the fuel supply nozzle 21, because, if it occurs, the fuel attached onto the upper end surface of the nozzle flows down over the end surface of the nozzle and finally reaches the fuel detector 22. Accordingly, the intercepting function of the barrier member 7 is arranged to be greater at its upper portion.

Figure 4:
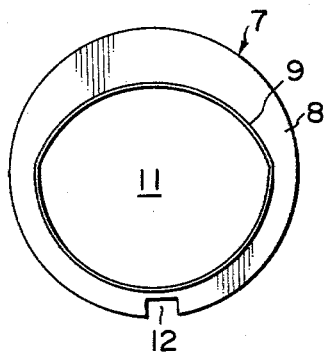
FIG. 4 is an end on view, similar to FIG. 2, showing another embodiment of the barrier member for incorporation in the fuel supply system according to the present invention, which is provided with a fuel draining notch on the outer part of its circumference, instead of being completely cut through at this point.

FIG. 4 shows a barrier member 7 which is a slight modification of the barrier member 7 shown in FIGS. 1–3. This barrier member 7 is substantially the same as the barrier member 7 shown in FIG. 2, except that the fuel drain gap 12 is provided as a simple notch formed in the outer part of the barrier member 7, rather than as a cut away portion cut through the annular shape of the barrier member 7. This fuel drain gap 12 provides effectively the same draining function as was provided by the fuel drain gap 12 in the first embodiment. Of course, because the gap 12 is necessarily somewhat smaller in this embodiment, it cannot drain as high a rate of flow of fuel as was possible in the first embodiment. On the other hand, because the fuel drain gap 12 is only formed in part of the barrier member 7, and is not formed in the tubular second portion 9 at all, the strength of the barrier member 7 is much enhanced, and, accordingly, the process of fitting it within the fuel supply tube 1 is made easier and more positive. Further, the process of constructing the tubular second portion 9 is made easier, because the tubular second portion 9 in this embodiment is a continuous tube which is not interrupted.

According to the present invention, therefore, it is seen that there is provided a fuel supply mechanism in which the provision of a barrier member such as the barrier member 7 effectively prevents the splashing back of fuel, especially from a curved upper portion of the fuel supply tube, from undesirably interfering with an auto-stop mechanism situated on the end of a supply nozzle of a fuel supply pump which is providing fuel to the fuel tank, and, accordingly, the filling of such a fuel tank through such a fuel supply system can be performed more effectively and efficiently, without any interruption disturbing its continuity.

Although the present invention has been shown and described in terms of several preferred embodiments thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

We claim:

1. A fuel supply system for supplying fuel to a fuel tank, comprising:
   a fuel supply tube, a lower end of which is connected to said fuel tank, and an upper end of which defines a fuel input orifice for allowing a fuel supply nozzle to be inserted into the fuel supply tube;
   a closure bung located within the fuel supply tube near the fuel input orifice and formed with an aperture for allowing said fuel supply nozzle to be inserted therethrough; and
   a barrier member located within the fuel supply tube near the closure bung at a lower side thereof, comprising:
   a substantially flat-annular first portion which lies in a plane which is intersected substantially perpendicularly by an axis of the fuel supply tube, and whose outer edge meets the inner surface of the fuel supply tube; and a second portion substantially formed as a tube, a circumferential edge of one of whose ends is connected to an inner edge of said substantially flat-annular first portion, and which extends therefrom in the direction of the fuel tank with its axis substantially parallel to the axis of the fuel supply tube, the lowest part of said substantially flat-annular first portion being formed with a gap communicating its upper surface to its lower surface.

2. A fuel supply system according to claim 1, wherein the barrier member is not horizontal.

3. A fuel supply system according to claim 2, wherein the highest part of the flat-annular first portion is of generally greater radial extent than the remainder thereof.

4. A fuel supply system according to claim 2, wherein the gap opens the substantially flat-annular first portion, passing from its outer edge to its inner edge; and wherein the substantially tubular shape of the second portion is interrupted by an axial slot which corresponds to the gap.

5. A fuel supply system according to claim 1, wherein the gap is formed as a notch cut in from the outside edge of said first portion.

6. A fuel supply system according to any one of claims 1, 2, 3, 4 or 5 wherein the fuel supply tube is cured at a position just below the barrier member.

* * * * *